United States Patent
Sugimoto et al.

(10) Patent No.: US 11,649,314 B2
(45) Date of Patent: May 16, 2023

(54) ANTISTATIC AGENT FOR THERMOPLASTIC RESIN

(71) Applicant: SANYO CHEMICAL INDUSTRIES, LTD., Kyoto (JP)

(72) Inventors: Yuko Sugimoto, Kyoto (JP); Shinichi Fujita, Kyoto (JP)

(73) Assignee: SANYO CHEMICAL INDUSTRIES, LTD., Kyoto (JP)

(*) Notice: Subject to any disclaimer, the term of this patent is extended or adjusted under 35 U.S.C. 154(b) by 12 days.

(21) Appl. No.: 17/633,005

(22) PCT Filed: Oct. 7, 2021

(86) PCT No.: PCT/JP2021/037096
§ 371 (c)(1),
(2) Date: Feb. 4, 2022

(87) PCT Pub. No.: WO2022/264441
PCT Pub. Date: Dec. 22, 2022

(65) Prior Publication Data
US 2022/0403086 A1   Dec. 22, 2022

(30) Foreign Application Priority Data
Jun. 18, 2021 (JP) .............................. JP2021-101264

(51) Int. Cl.
| | | |
|---|---|---|
| C08F 293/00 | (2006.01) | |
| C08K 5/42 | (2006.01) | |
| C08L 25/06 | (2006.01) | |
| C08L 23/12 | (2006.01) | |
| C08L 9/06 | (2006.01) | |

(52) U.S. Cl.
CPC .............. *C08F 293/00* (2013.01); *C08K 5/42* (2013.01); *C08L 9/06* (2013.01); *C08L 23/12* (2013.01); *C08L 25/06* (2013.01)

(58) Field of Classification Search
CPC ............ C08F 293/00; C08F 8/46; C08L 9/06; C08L 23/12; C08L 25/06; C08L 2201/04; C08L 87/005; C08G 81/00; C08G 81/025; C08K 5/42
USPC ........................................................ 524/158
See application file for complete search history.

(56) References Cited

U.S. PATENT DOCUMENTS

| | | | |
|---|---|---|---|
| 6,521,683 B1 | 2/2003 | Simmons et al. | |
| 6,552,131 B1 * | 4/2003 | Higuchi ................. | C08L 23/02 525/193 |
| 2005/0049360 A1 | 3/2005 | Okamoto | |
| 2013/0102710 A1 | 4/2013 | Noda et al. | |
| 2016/0289375 A1 | 10/2016 | Nakamura et al. | |
| 2016/0304702 A1 | 10/2016 | Saito et al. | |
| 2021/0032410 A1 | 2/2021 | Hasegawa et al. | |

FOREIGN PATENT DOCUMENTS

| | | | |
|---|---|---|---|
| CN | 1827670 | | 9/2006 |
| CN | 102959035 | | 3/2013 |
| CN | 105051146 | | 11/2015 |
| CN | 111727212 | | 9/2020 |
| JP | 60-094432 | | 5/1985 |
| JP | 06065508 A | * | 3/1994 |
| JP | 08-12755 | | 1/1996 |
| JP | 10-67909 | | 3/1998 |
| JP | 2002-543230 | | 12/2002 |
| JP | 2003-034748 | | 2/2003 |
| JP | 2008-31460 | | 2/2008 |
| JP | 2010-196050 | | 9/2010 |
| JP | 2013-136724 | | 7/2013 |
| WO | 2015/008507 | | 1/2015 |
| WO | 2016/084954 | | 6/2016 |

OTHER PUBLICATIONS

JP 06-065508 A, machine translation, EPO espacenet. (Year: 1994).*
Written Opinion of the International Searching Authority dated Nov. 2, 2021 in International (PCT) Application No. PCT/JP2021/037096 with English translation.

* cited by examiner

*Primary Examiner* — Frances Tischler
(74) *Attorney, Agent, or Firm* — Wenderoth, Lind & Ponack, L.L.P.

(57) ABSTRACT

An antistatic agent for thermoplastic resins (Z) containing a block polymer (A) having a block of a hydrophobic polymer (a) and a block of a hydrophilic polymer (b) as structure units, and a C6-C18 branched alkylbenzenesulfonate (S); an antistatic resin composition (Y) containing the antistatic agent (Z) and a thermoplastic resin (E); and a molded article of the antistatic resin composition (Y).

8 Claims, No Drawings

ANTISTATIC AGENT FOR THERMOPLASTIC RESIN

TECHNICAL FIELD

The present invention relates to an antistatic agent for thermoplastic resins, an antistatic resin composition, and a molded article.

BACKGROUND ART

Conventionally, an antistatic agent has been commonly used as a method of imparting antistatic property to highly insulating thermoplastic resins. Methods of imparting antistatic property using an antistatic agent include a known method in which a small amount of polyether ester amide serving as a polymer antistatic agent (for example, see Patent Literature 1) is kneaded into a resin.

However, the antistatic property imparted by the method of kneading the polymer antistatic agent is considered to be insufficient.

CITATION LIST

Patent Literature

Patent Literature 1: JP H08-12755 A

SUMMARY OF INVENTION

Technical Problem

An object of the present invention is to provide an antistatic agent for thermoplastic resins, which imparts excellent antistatic property to molded articles containing a thermoplastic resin.

Solution to Problem

As a result of extensive studies to achieve the object, the present inventors arrived at the present invention. Specifically, the present invention provides an antistatic agent for thermoplastic resins (Z) containing a block polymer (A) having a block of a hydrophobic polymer (a) and a block of a hydrophilic polymer (b) as structure units, and a C6-C18 branched alkylbenzenesulfonate (S). The present invention also provides an antistatic resin composition (Y) containing the antistatic agent for thermoplastic resins (Z) and a thermoplastic resin (E). The present invention still also provides a molded article of the antistatic resin composition (Y).

Advantageous Effects of Invention

The present invention can improve the continuous moldability (demoldability) during molding and can provide molded articles excellent in antistatic property and mechanical strength (mechanical properties).

DESCRIPTION OF EMBODIMENTS

An antistatic agent for thermoplastic resins (Z) of the present invention contains a block polymer (A) having a block of a hydrophobic polymer (a) and a block of a hydrophilic polymer (b) as structure units, and a C6-C18 branched alkylbenzenesulfonate (S).

<Hydrophobic Polymer (a)>

Preferably, the hydrophobic polymer (a) in the present invention is at least one selected from the group consisting of a polyamide (a1), a polyolefin (a2), and a polyester (a3).

The hydrophobic polymer (a) is more preferably the polyamide (a1) or the polyolefin (a2), particularly preferably the polyolefin (a2) in terms of antistatic property.

Preferably, the hydrophobic polymer (a) in the present invention is a polymer having a volume specific resistance greater than $1 \times 10^{11}$ Ω·cm.

The volume specific resistance in the present invention is a numerical value determined under an atmospheric environment at 23° C. with 50% RH according to ASTM D257 (1984).

The hydrophobic polymer (a) may consist of one of the above hydrophobic polymers or a combination of two or more of those.

<Polyamide (a1)>

Examples of the polyamide (a1) in the present invention include those obtained by ring-opening polymerization or polycondensation of an amide-forming monomer (a10).

Examples of the amide-forming monomer (a10) include a lactam (a101) and an aminocarboxylic acid (a102). The amide-forming monomer (a10) may be a combination of a diamine (a103) and a dicarboxylic acid (a104).

Specifically, examples of the polyamide (a1) include those obtained by ring-opening polymerization or polycondensation of the lactam (a101) or the aminocarboxylic acid (a102) and a polycondensate of the diamine (a103) and the dicarboxylic acid (a104).

Examples of the lactam (a101) include lactams having 4 to 20 carbon atoms (hereinafter, the number of carbon atoms may be abbreviated as C) (e.g., γ-lactam, δ-lactam, ε-caprolactam, enantholactam, caprylic lactam, ω-laurolactam, and undecanolactam).

Examples of ring-opening polymers of the lactam (a101) include nylon 4, nylon 5, nylon 6, nylon 7, nylon 8, nylon 11, and nylon 12.

Examples of the aminocarboxylic acid (a102) include C6-C12 aminocarboxylic acids (e.g., ω-aminocaproic acid, ω-aminoenanthic acid, ω-aminocaprylic acid, ω-aminopelargonic acid, ω-aminocapric acid, 11-aminoundecanoic acid, 12-aminododecanoic acid, and mixtures of these).

Examples of the diamine (a103) include C2-C40 diamines, such as aliphatic, alicyclic, or aromatic diamines, aromatic aliphatic diamines, and mixtures of these.

Examples of the aliphatic diamines include C2-C40 aliphatic diamines (e.g., ethylenediamine, propylenediamine, hexamethylenediamine, decamethylenediamine, 1,12-dodecanediamine, 1,18-octadecanediamine, and 1,20-eicosanediamine).

Examples of the alicyclic diamine include C5-C40 alicyclic diamines (e.g., 1,3- or 1,4-cyclohexanediamine, isophoronediamine, 4,4'-diaminocyclohexylmethane, and 2,2-bis(4-aminocyclohexyl)propane).

Examples of the aromatic diamines include C6-C40 aromatic diamines (e.g., p-phenylenediamine, 2,4- or 2,6-toluenediamine, and 2,2-bis(4,4'-diaminophenyl)propane).

Examples of the aromatic aliphatic diamines include C7-C20 aromatic aliphatic diamines (e.g., xylylenediamine, bis(aminoethyl)benzene, bis(aminopropyl)benzene, and bis(aminobutyl)benzene).

Examples of the dicarboxylic acid (a104) include C2-C40 dicarboxylic acids. Examples include aliphatic dicarboxylic acids; aromatic ring-containing dicarboxylic acids; alicyclic dicarboxylic acids; derivatives of these dicarboxylic acids, such as acid anhydrides, lower (C1-C4) alkyl esters, and dicarboxylic acid salts (e.g., alkali metal salts, such as lithium, sodium, and potassium salts); and mixtures of two or more of these.

Examples of the aliphatic dicarboxylic acids include C2-C40 (preferably C4-C20, more preferably C6-C12 in terms of antistatic property) aliphatic dicarboxylic acids (e.g., succinic acid, glutaric acid, adipic acid, pimelic acid, suberic acid, azelaic acid, sebacic acid, undecane diacid, dodecane diacid, maleic acid, fumaric acid, and itaconic acid).

Examples of the aromatic ring-containing dicarboxylic acids include C8-C40 (preferably C8-C16, more preferably C8-C14 in terms of antistatic property) aromatic ring-containing dicarboxylic acids (e.g., orthophthalic acid, isophthalic acid, terephthalic acid, 2,6- or 2,7-naphthalenedicarboxylic acid, diphenyl-4,4'-dicarboxylic acid, diphenoxyethanedicarboxylic acid, toluenedicarboxylic acid, xylylenedicarboxylic acid, and 5-sulfoisophthalic acid alkali metal (as described above) salts).

Examples of the alicyclic dicarboxylic acids include C5-C40 (preferably C6-C18, more preferably C8-C14 in terms of antistatic property) alicyclic dicarboxylic acids (e.g., cyclopropanedicarboxylic acid, 1,4-cyclohexanedicarboxylic acid, cyclohexenedicarboxylic acid, dicyclohexyl-4,4'-dicarboxylic acid, and camphoric acid).

The amide-forming monomer (a10) is preferably ε-caprolactam, 12-aminododecanoic acid, or a combination of adipic acid and hexamethylenediamine in terms of antistatic property.

The polyamide (a1) may be produced by a method in which the amide-forming monomer (a10) is ring-opening polymerized or polycondensed in the presence of a molecular weight adjusting agent. The molecular weight adjusting agent may be either a diamine or a dicarboxylic acid. Examples of the diamine and the dicarboxylic acid include compounds mentioned as examples of the diamine (a103) (C2-C40, preferably C4-C20) and the dicarboxylic acid (a104) (C2-C40, preferably C4-C20), respectively. One of these compounds may be used alone, or two or more of these may be used.

The amount of the molecular weight adjusting agent used is preferably 2 to 80 wt %, more preferably 4 to 75 wt % based on the total weight of the amide-forming monomer (a10) and the molecular weight adjusting agent in terms of antistatic property.

The number average molecular weight of the polyamide (a1) is preferably 200 to 5,000, more preferably 500 to 4,000, particularly preferably 800 to 3,000 in terms of antistatic property and moldability.

Herein, the number average molecular weight of the polymer (hereinafter abbreviated as Mn) is a value measured by gel permeation chromatography (GPC) under the following conditions.

Device: "HLC-8120" (available from Tosoh Corporation)
Column: "TSK gel GMHXL" (available from Tosoh Corporation) (two columns) and "TSK gel Multipore HXL-M" (available from Tosoh Corporation) (one column)
Sample solution: 0.3 wt % ortho dichlorobenzene solution
Amount of solution added: 100 μl
Flow rate: 1 ml/min
Measurement temperature: 135° C.
Detecting device: refractive index detector
Reference material: standard polystyrene (TSK standard POLYSTYRENE) 12 samples (molecular weight: 500, 1,050, 2,800, 5,970, 9,100, 18,100, 37,900, 96,400, 190,000, 355,000, 1,090,000, 2,890,000) (available from Tosoh Corporation)

<Polyolefin (a2)>

Preferably, the polyolefin (a2) in the present invention is a polyolefin having a reactive group. Examples of the polyolefin (a2) include a polyolefin (a21) having a reactive group at each end and a polyolefin (a22) having a reactive group at one end.

The reactive group refers to a carboxy group, a carboxylic acid anhydride group, a hydroxy group, an amino group, and an isocyanate group.

<Polyolefin (a21) Having a Reactive Group at Each End>

Examples of the polyolefin (a21) having a reactive group at each end include a polyolefin (a21-1) having a carboxy group or a carboxylic acid anhydride group at each end of the polymer, a polyolefin (a21-2) having a hydroxy group at each end of the polymer, a polyolefin (a21-3) having an amino group at each end of the polymer, and a polyolefin (a21-4) having an isocyanate group at each end of the polymer. Of these, the polyolefin (a21-1) having a carboxy group or a carboxylic acid anhydride group at each end of the polymer is preferred in terms of ease of modification and heat resistance during molding.

The "end" herein refers to a terminal portion where the repeated structure of the monomer unit constituting the polymer terminates. The "each end" refers to each end of the main chain of the polymer.

The polyolefin (a21) having a reactive group at each end can be obtained by, for example, introducing a carboxy group, a carboxylic acid anhydride group, a hydroxy group, an amino group, or an isocyanate group into each end of a polyolefin (a21-0) mainly containing a polyolefin in which each end is modifiable.

The "mainly containing" herein means that the weight of the polyolefin in which each end is modifiable accounts for 50 wt % or more of the weight of the whole polyolefin.

However, even when the weight of the polyolefin in which each end is modifiable accounts for less than 50 wt % of the weight of the whole polyolefin, if the total weight of the polyolefin in which each end is modifiable and a polyolefin in which one end is modifiable described later accounts for 50 wt % or more of the weight of the whole polyolefin, and the weight of the polyolefin in which each end is modifiable is greater than the weight of the polyolefin in which one end is modifiable, such a polyolefin is considered to be the polyolefin (a21-0) mainly containing a polyolefin in which each end is modifiable.

Examples of the polyolefin (a21-0) mainly containing a polyolefin in which each end is modifiable include a polyolefin obtained by (co)polymerization of one of C2-C30 (preferably C2-C12, more preferably C2-C10) olefins or a mixture of two or more thereof and containing 30 mol % or more of a propylene-derived structure unit, and a degraded polyolefin (obtained by mechanically, thermally, or chemically degrading a high-molecular-weight (preferably, the Mn is 10,000 to 150,000) polyolefin). The "(co)polymerization" refers to polymerization or copolymerization.

Of these, a degraded polyolefin is preferred, and a thermally degraded polyolefin is more preferred in terms of ease of modification upon introduction of a carboxy group, a carboxylic acid anhydride group, a hydroxy group, an amino group, or an isocyanate group, and easy availability. Thermal degradation easily provides a low-molecular-weight polyolefin in which the number of terminal double bonds per molecule is one or two as described later, and the low-molecular-weight polyolefin is easily modifiable by introduction of a carboxyl group, a carboxylic anhydride group, a hydroxyl group, an amino group, or an isocyanate group.

Examples of the thermally degraded polyolefin include one obtained by heating a high-molecular-weight polyolefin in an inert gas (one obtained by heating at 300° C. to 450° C. for 0.5 to 10 hours, for example, by the method described in JP H03-62804 A) and one obtained by thermal degradation by heating in the air.

Examples of the high-molecular-weight polyolefin used in thermal degradation include a (co)polymer of a mixture of one or more of C2-C30 (preferably C2-C12, more preferably C2-C10) olefins (the Mn of the (co)polymer is preferably 10,000 to 150,000, more preferably 15,000 to 70,000; and the melt flow rate (hereinafter abbreviated as MFR; unit: g/10 min) is preferably 0.5 to 150, more preferably 1 to 100) in which a propylene-derived structure unit accounts for 30 mol % or more of the polyolefin. The MFR herein is a numerical value representing the melt viscosity of the resin. A larger MFR indicates a lower melt viscosity. The MFR is measured according to the method specified in JIS K7210-1 (2014). In the case of polypropylene, the MFR is measured at 230° C. with a load of 2.16 kgf.

Examples of the C2-C30 olefins include C2-C30 α-olefins and C4-C30 dienes.

Examples of the C2-C30 α-olefins include ethylene, propylene, 1-butene, 4-methyl-1-pentene, 1-pentene, 1-octene, 1-decene, 1-dodecene, 1-icosene, and 1-tetracosene.

Examples of the C4-C30 dienes include butadiene, isoprene, cyclopentadiene, and 1,11-dodecadiene.

The C2-C30 olefin is preferably a C2-C12 α-olefin, butadiene, isoprene, or a mixture of these, more preferably a C2-C10 α-olefin, butadiene, or a mixture of these, particularly preferably ethylene, propylene (which are C2-C3 α-olefins), or a mixture of these in terms of molecular weight control.

<Polyolefin (a22) Having a Reactive Group at One End>

Examples of the polyolefin (a22) having a reactive group at one end include a polyolefin (a22-1) having a carboxy group or a carboxylic acid anhydride group at one end of the polymer, a polyolefin (a22-2) having a hydroxy group at one end of the polymer, a polyolefin (a2-3) having an amino group at one end of the polymer, a polyolefin (a22-4) having an isocyanate group at one end of the polymer, and a polyolefin (a22-5) having both a carboxy group and a hydroxy group at one end of the polymer.

Of these, the polyolefin (a22-1) having a carboxy group or a carboxylic acid anhydride group at one end of the polymer is preferred in terms of ease of modification and heat resistance during molding.

The "one end" refers to either end in the main chain of the polymer.

The polyolefin (a22) having a reactive group at one end can be obtained by, for example, introducing a carboxy group, a carboxylic acid anhydride group, a hydroxy group, an amino group, or an isocyanate group into a polyolefin (a22-0) mainly containing a polyolefin in which one end is modifiable.

The "mainly containing" herein means that the weight of the polyolefin in which one end is modifiable accounts for 50 wt % or more of the weight of the whole polyolefin.

However, even when the weight of the polyolefin in which one end is modifiable accounts for less than 50 wt % of the weight of the whole polyolefin, if the total weight of the polyolefin in which one end is modifiable and a polyolefin in which each end is modifiable described above accounts for 50 wt % or more of the weight of the whole polyolefin, and the weight of the polyolefin in which one end is modifiable is greater than the weight of the polyolefin in which each end is modifiable, such a polyolefin is considered to be the polyolefin (a22-0) mainly containing a polyolefin in which one end is modifiable.

The polyolefin (a22-0) mainly containing a polyolefin in which one end is modifiable can be obtained in the same manner as in the case of the polyolefin (a21-0) mainly containing a polyolefin in which each end is modifiable.

The polyolefin (a21-0) mainly containing a polyolefin in which each end is modifiable and the polyolefin (a22-0) mainly containing a polyolefin in which one end is modifiable are commonly obtained as a mixture containing these polyolefins. The mixture may be used as is, or each polyolefin may be separated by purification before use. The mixture is preferred in terms of production cost or the like.

Hereinafter, a description is given on the polyolefins (a21-1) to (a21-4) each having a carboxy group, a carboxylic acid anhydride group, a hydroxy group, an amino group, or an isocyanate group at each end of the polyolefin (a21-0) mainly containing a polyolefin in which each end is modifiable. The polyolefins (a22-1) to (a22-4) having one of these groups at one end of the polyolefin (a22-0) mainly containing a polyolefin in which one end is modifiable can be obtained in the same manner as in the case of the above-described polyolefins (a21-1) to (a21-4) by replacing the polyolefin (a21-0) mainly containing a polyolefin in which each end is modifiable with the polyolefin (a22-0) mainly containing a polyolefin in which one end is modifiable. Preferred examples of the polyolefin (a21) having a reactive group at each end and preferred examples of the polyolefin (a22) having a reactive group at one end are the same.

Examples of the polyolefin (a21-1) having a carboxy group or a carboxylic acid anhydride group at each end of the polymer include a polyolefin (a21-1-1) having a structure obtained by modifying the ends of the polyolefin (a21-0) mainly containing a polyolefin in which each end is modifiable with an α,β-unsaturated carboxylic acid (anhydride), a polyolefin (a21-1-2) having a structure obtained by further modifying the polyolefin (a21-1-1) with a lactam or an aminocarboxylic acid, a polyolefin (a21-1-3) having a structure obtained by modifying the polyolefin (a21-0) mainly containing a polyolefin in which each end is modifiable by oxidation or hydroformylation, a polyolefin (a21-1-4) having a structure obtained by further modifying the polyolefin (a21-1-3) with a lactam or an aminocarboxylic acid, and mixtures of two or more of these.

The "α,β-unsaturated carboxylic acid (anhydride)" refers to an α,β-unsaturated carboxylic acid or its anhydride.

The polyolefin (a21-1-1) can be obtained by modifying the polyolefin (a21-0) mainly containing a polyolefin in which each end is modifiable with an α,β-unsaturated carboxylic acid (anhydride).

Examples of the α,β-unsaturated carboxylic acid (anhydride) usable for modification include monocarboxylic acids, dicarboxylic acids, and anhydrides of these. Specific examples include (meth)acrylic acid, maleic acid (or its anhydride), fumaric acid, itaconic acid (or its anhydride), and citraconic acid (or its anhydride).

Of these, an anhydride of a mono- or dicarboxylic acid and a dicarboxylic acid are preferred, maleic acid (or its anhydride) and fumaric acid are more preferred, and maleic acid (or its anhydride) is particularly preferred in terms of ease of modification.

The "(meth)acrylic acid" refers to acrylic acid or methacrylic acid.

The polyolefin (a21-1-2) can be obtained by further modifying the polyolefin (a21-1-1) with the lactam or the aminocarboxylic acid.

The polyolefin (a21-1-3) can be obtained by introducing a carboxy group into the polyolefin (a21-0) mainly containing a polyolefin in which each end is modifiable through oxidation with oxygen and/or ozone (oxidation method) or through hydroformylation (oxo method). Introduction of a carboxy group by the oxidation method can be carried out by a known method such as the method described in U.S. Pat. No. 3,692,877. Introduction of a carboxy group by hydroformylation can be carried out by various methods including known methods such as the method described in Macromolecules, VOL. 31, p. 5943.

The polyolefin (a21-1-4) can be obtained by further modifying the polyolefin (a21-1-3) with a lactam or an aminocarboxylic acid.

The polyolefin (a21-1) having a carboxy group or a carboxylic acid anhydride group at each end of the polymer has an acid value of preferably 4 to 100 mgKOH/g, more preferably 4 to 50 mgKOH/g, particularly preferably 5 to 30 mgKOH/g in terms of reactivity with the hydrophilic polymer (b).

Examples of the polyolefin (a21-2) having a hydroxy group at each end of the polymer include polyolefins each having a hydroxy group obtained by modifying the polyolefin (a21-1) having a carboxy group or a carboxylic acid anhydride group at each end of the polymer with an amine having a hydroxy group, and mixtures of two or more of these.

Examples of the amine having a hydroxy group usable for modification include C2-C10 amines having a hydroxy group. Specific examples include 2-aminoethanol, 3-aminopropanol, 1-amino-2-propanol, 4-aminobutanol, 5-aminopentanol, 6-aminohexanol, and 3-aminomethyl-3,5,5-trimethylcyclohexanol.

The polyolefin (a21-2) having a hydroxy group at each end of the polymer has a hydroxy value of preferably 4 to 100 mgKOH/g, more preferably 4 to 50 mgKOH/g, particularly preferably 5 to 30 mgKOH/g in terms of reactivity with the hydrophilic polymer (b).

Examples of the polyolefin (a21-3) having an amino group at each end of the polymer include polyolefins each having an amino group obtained by modifying the polyolefin (a21-1) with a diamine, and mixtures of two or more of these.

Examples of the diamine include C2-C12 diamines. Specific examples include ethylenediamine, hexamethylenediamine, heptamethylenediamine, octamethylenediamine, and decamethylenediamine.

Of these, C2-C8 diamines (e.g., ethylenediamine, hexamethylenediamine, heptamethylenediamine, and octamethylenediamine) are preferred, ethylenediamine and hexamethylenediamine are more preferred, and ethylenediamine is particularly preferred in terms of ease of modification.

The polyolefin (a21-3) having an amino group at each end of the polymer has an amine value of preferably 4 to 100 mgKOH/g, more preferably 4 to 50 mgKOH/g, particularly preferably 5 to 30 mgKOH/g in terms of reactivity with the hydrophilic polymer (b).

Examples of the polyolefin (a21-4) having an isocyanate group at each end of the polymer include polyolefins each having an isocyanate group obtained by modifying the polyolefin (a21-2) with a polyisocyanate (with at least two isocyanate groups), and mixtures of two or more of these.

Examples of the polyisocyanate include aromatic polyisocyanates having the number of carbon atoms (the carbon atoms in the isocyanate group are excluded; the same shall apply hereinafter) of 6 to 20, C2-C18 aliphatic polyisocyanates, C4-C15 alicyclic polyisocyanates, C8-C15 aromatic aliphatic polyisocyanates, modified products of these polyisocyanates, and mixtures of two or more of these.

Examples of the polyolefin (a22-5) having both a carboxy group and a hydroxy group at one end of the polymer include a polyolefin (a22-5-1) having a structure obtained by firstly modifying one end of the polyolefin (a22-0) mainly containing a polyolefin in which one end is modifiable with an α,β-unsaturated carboxylic acid anhydride, and secondly modifying the resultant polyolefin with a diol amine.

Examples of the diol amine used for the second modification include diethanolamine.

The polyolefin (a21) having a reactive group at each end and the polyolefin (a22) having a reactive group at one end each have a Mn of preferably 1,000 to 25,000, more preferably 1,500 to 12,000, particularly preferably 2,000 to 7,000 in terms of antistatic property.

<Polyester (a3)>

The polyester (a3) in the present invention is, for example, a polymer containing a diol (a31) and a dicarboxylic acid (a32) as constituent monomers.

Examples of the diol (a31) include an aliphatic diol (a311) and an aromatic group-containing diol (a312).

Examples of the dicarboxylic acid (a32) include an aliphatic dicarboxylic acid (a321) and an aromatic dicarboxylic acid (a322).

The diol (a31) may be one of the above diols or a mixture of two or more of these.

Examples of the aliphatic diol (a311) include 1,2-ethanediol (ethylene glycol), 1,2-propanediol (propylene glycol), 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolpentane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexanedimethanol, hydrogenated bisphenol A, 1,2-, 1,3-, or 1,4-cyclohexanediol, cyclododecanediol, dimer diol, hydrogenated dimer diol, diethylene glycol, dipropylene glycol, and triethylene glycol.

Examples of the aromatic group-containing diol (a312) include bisphenol A, 1,2-hydroxybenzene, 1,3-hydroxybenzene, 1,4-hydroxybenzene, and 1,4-benzenedimethanol.

Examples of the aliphatic dicarboxylic acid (a321) include C2-C20 (preferably C4-C16) aliphatic dicarboxylic acids, oxalic acid, malonic acid, succinic acid, glutaric acid, adipic acid, pimelic acid, suberic acid, azelaic acid, sebacic acid, 1,10-decandicarboxylic acid, 1,4-cyclohexanedicarboxylic acid, dimer acid, maleic acid, and fumaric acid.

The aliphatic dicarboxylic acid (a321) may be an alkyl ester or a halide of any of the above acids.

Examples of the aromatic dicarboxylic acid (a322) include C8-C20 aromatic dicarboxylic acids, terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, and naphthalenedicarboxylic acid.

The aromatic dicarboxylic acid (a322) may be an alkyl ester or a halide of any of the above acids.

The polyester (a3) has a Mn of preferably 800 to 8,000, more preferably 1,000 to 6,000, particularly preferably 2,000 to 4,000 in terms of antistatic property and moldability.

<Hydrophilic Polymer (b)>

Examples of the hydrophilic polymer (b) in the present invention include hydrophilic polymers described in JP 3488163 B. Specific examples include a polyether (b1) and a polyether-containing hydrophilic polymer (b2). The polyether (b1) is preferred in terms of antistatic property and resin properties.

Preferably, the hydrophilic polymer (b) in the present invention is a polymer having a volume specific resistance of $1 \times 10^{11}$ $\Omega \cdot cm$ or less.

Examples of the polyether (b1) include a polyetherdiol (b1-1), a polyetherdiamine (b1-2), and modified products (b1-3) of these.

Examples of the polyetherdiol (b1-1) include those obtained by addition reaction of an alkylene oxide (hereinafter abbreviated as AO) to a diol (b0). Specific examples include those represented by the formula (1):

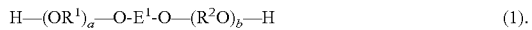

$$H-(OR^1)_a-O-E^1-O-(R^2O)_b-H \qquad (1).$$

$E^1$ in the formula (1) is a residue obtained by removing all hydroxy groups from the diol (b0).

$R^1$ and $R^2$ in the formula (1) are each independently a C2-C12 alkylene group, a styrene group, or a chloromethyl group. Of these, a C2-C4 alkylene group is preferred. Examples of the C2-C4 alkylene group include an ethylene group, a 1,2- or 1,3-propylene group, and a 1,2-, 1,3-, 1,4-, or 2,3-butylene group.

The letters "a" and "b" in the formula (1) are the average numbers of moles of $(OR^1)$ and $(R^2O)$ added, respectively, and are each independently 1 to 300, preferably 2 to 250, more preferably 10 to 100.

When "a" and "b" in the formula (1) are each 2 or greater, $R^1$ and $R^2$ may be the same as or different from each other, and $(OR^1)_a$ and $(R^2O)_b$ moieties may be bonded in a random form or a block form.

Examples of the diol (b0) include C2-C12 aliphatic dihydric alcohols, C5-C12 alicyclic dihydric alcohols, C6-C18 aromatic dihydric alcohols, and tertiary amino-containing diols.

Examples of the C2-C12 aliphatic dihydric alcohols include ethylene glycol (hereinafter abbreviated as EG), 1,2-propylene glycol, 1,4-butanediol, 1,6-hexanediol, neopentyl glycol, and 1,12-dodecanediol.

Examples of the C5-C12 alicyclic dihydric alcohols include 1,4-di(hydroxymethyl)cyclohexane and 1,5-di(hydroxymethyl)cycloheptane.

Examples of the C6-C18 aromatic dihydric alcohols include monocyclic aromatic dihydric alcohols (xylylenediol, hydroquinone, catechol, resorcin, and urushiol) and polycyclic aromatic dihydric alcohols (e.g., bisphenol A, bisphenol F, bisphenol S, 4,4'-dihydroxydiphenyl-2,2-butane, dihydroxybiphenyl, dihydroxynaphthalene, and binaphthol).

Examples of the tertiary amino-containing diols include bishydroxyalkylates of C1-C12 aliphatic or alicyclic primary amines (e.g., methylamine, ethylamine, cyclopropylamine, 1-propylamine, 2-propylamine, pentylamine, isopentylamine, cyclopentylamine, hexylamine, cyclohexylamine, heptylamine, nonylamine, decylamine, undecylamine, and dodecylamine), and bishydroxyalkylates of C6-C12 aromatic primary amines (e.g., aniline and benzylamine).

Of these, the diol (b0) is preferably a C2-C12 aliphatic dihydric alcohol or a C6-C18 aromatic dihydric alcohol, more preferably EG or bisphenol A in terms of reactivity with a bishydroxyalkylate.

The polyetherdiol (b1-1) can be produced by addition reaction of an AO to the diol (b0).

The AO is a C2-C4 AO (ethylene oxide (hereinafter abbreviated as EO), 1,2- or 1,3-propylene oxide, 1,2-, 1,3-, 1,4-, or 2,3-butylene oxide, or a combination of two or more of these). If necessary, an additional AO (e.g., C5-C12 α-olefin oxide, styrene oxide, or epihalohydrin (e.g., epichlorohydrin)) may be also used in a small portion (30 wt % or less based on the total weight of AOs).

The bonding form when two or more AOs are used in combination may be either a random form or a block form. The AO is preferably an EO alone or a combination of an EO and an additional AO.

The addition reaction of an AO can be carried out by a known method, for example, at a temperature of 100° C. to 200° C. in the presence of an alkaline catalyst.

The $(OR^1)_a$ and $(R^2O)_b$ content based on the weight of the polyetherdiol (b1-1) represented by the formula (1) is preferably 5 to 99.8 wt %, more preferably 8 to 99.6 wt %, particularly preferably 10 to 98 wt %.

The oxyethylene group content based on the weight of $(OR^1)_a$ and $(R^2O)_b$ in the formula (1) is preferably 5 to 100 wt %, more preferably 10 to 100 wt %, particularly preferably 50 to 100 wt %, most preferably 60 to 100 wt %.

The polyetherdiol (b1-1) is preferably a bisphenol A EO adduct or polyethylene glycol.

Examples of the polyetherdiamine (b1-2) include those represented by the formula (2):

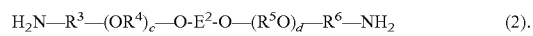

$$H_2N-R^3-(OR^4)_c-O-E^2-O-(R^5O)_d-R^6-NH_2 \qquad (2).$$

$E^2$ in the formula (2) is a residue obtained by removing all hydroxy groups from the diol (b0).

Examples of the diol (b0) and preferred scope thereof are the same as those mentioned above for the polyetherdiol (b1-1).

$R^3$, $R^4$, $R^5$, and $R^6$ in the formula (2) are each independently a C2-C4 alkylene group, a C5-C12 alkylene group, a styrene group, or a chloromethyl group. Examples of the C2-C4 alkylene groups include those mentioned as examples of $R^2$ and $R^2$ in the formula (1).

The letters "c" and "d" in the formula (2) are the average numbers of moles of $(OR^4)$ and $(R^5O)$ added, respectively, and are each independently 1 to 300, preferably 2 to 250, more preferably 10 to 100.

When "c" and "d" in the formula (2) are each 2 or greater, $R^4$ and $R^5$ may be the same as or different from each other, and $(OR^4)_c$ and $(R^5O)_d$ moieties may be bonded in a random form or a block form.

The polyetherdiamine (b1-2) can be obtained by converting all hydroxy groups of the polyetherdiol (b1-1) to alkyl amino groups. For example, the polyetherdiamine (b1-2) can be produced by reacting the polyetherdiol (b1-1) with acrylonitrile, and hydrogenating the resulting cyanoethylate.

Examples of the modified products (b1-3) include an aminocarboxylic acid modified product (terminated with an amino group) of the polyetherdiol (b1-1) or the polyetherdiamine (b1-2), an isocyanate modified product (terminated with an isocyanate group) of the polyetherdiol (b1-1) or the polyetherdiamine (b1-2), and an epoxy modified product (terminated with an epoxy group) of the polyetherdiol (b1-1) or the polyetherdiamine (b1-2).

The aminocarboxylic acid modified product can be obtained by reacting the polyetherdiol (b1-1) or the polyetherdiamine (b1-2) with an aminocarboxylic acid or a lactam.

The isocyanate modified product can be obtained by reacting the polyetherdiol (b1-1) or the polyetherdiamine (b1-2) with a polyisocyanate, or by reacting the polyetherdiamine (b1-2) with phosgene.

The epoxy modified product can be obtained by reacting the polyetherdiol (b1-1) or the polyetherdiamine (b1-2) with a diepoxide (an epoxy resin such as diglycidyl ether, diglycidyl ester, or alicyclic diepoxide; epoxy equivalent: 85 to 600), or by reacting the polyetherdiol (b1-1) with epihalohydrin (e.g., epichlorohydrin).

The hydrophilic polymer (b) has a Mn of preferably 150 to 20,000, more preferably 300 to 18,000, particularly preferably 1,000 to 15,000, most preferably 1,200 to 8,000 in terms of heat resistance and reactivity with the hydrophobic polymer (a).

<Block Polymer (A)>

The block polymer (A) in the antistatic agent for thermoplastic resins (Z) of the present invention contains a block of the hydrophobic polymer (a) and a block of the hydrophilic polymer (b) as structure units. The block polymer (A) may contain one or more hydrophobic polymers (a) and one or more hydrophilic polymers (b).

The weight ratio of a block of the hydrophobic polymer (a) to a block of the hydrophilic polymer (b) constituting the block polymer (A) (weight of a block of the hydrophobic polymer (a)/weight of a block of the hydrophilic polymer (b)) is preferably 10/90 to 80/20, more preferably 20/80 to 75/25 in terms of antistatic property and water resistance.

Examples of the structure in which a block of the hydrophobic polymer (a) and a block of the hydrophilic polymer (b) constituting the block polymer (A) are bonded include a (a)-(b) structure, a (a)-(b)-(a) structure, a (b)-(a)-(b) structure, and a [(a)-(b)]n structure (n indicates the average repeating number).

Preferably, the structure of the block polymer (A) is the [(a)-(b)]n structure in which the hydrophobic polymer (a) and the hydrophilic polymer (b) are alternately repeatedly bonded in terms of conductivity.

The "n" in the [(a)-(b)]n structure is preferably 2 to 50, more preferably 2.3 to 30, particularly preferably 2.7 to 20, most preferably 3 to 10 in terms of antistatic property and mechanical strength (mechanical properties). The "n" can be determined from the Mn of the block polymer (A) and $^1$H-NMR analysis.

The block polymer (A) has a Mn of preferably 2,000 to 100,000, more preferably 5,000 to 60,000, particularly preferably 10,000 to 40,000 in terms of mechanical strength (mechanical properties) and antistatic property of the resulting molded article (described later).

In the case where the block polymer (A) has a structure in which a block of the hydrophobic polymer (a) and a block of the hydrophilic polymer (b) are bonded via an ester bond, an amide bond, an ether bond, or an imide bond, such a block polymer (A) can be produced by the following method.

Of these bonds, an ester bond and an amide bond are preferred in terms of industrial applications.

The hydrophobic polymer (a) and the hydrophilic polymer (b) are charged into a reaction vessel, and the mixture is reacted with stirring at a reaction temperature of 100° C. to 250° C. at a pressure of 0.003 to 0.1 MPa for 1 to 50 hours while water generated in amidation, esterification, etherification, or imidization (hereinafter, abbreviated as generated water) is removed from the reaction system. The hydrophobic polymer (a) and the hydrophilic polymer (b) for use in the reaction are mixed at a weight ratio (weight of the hydrophobic polymer (a)/weight of the hydrophilic polymer (b)) of 10/90 to 80/20, preferably 20/80 to 75/25 in terms of antistatic property and water resistance.

In the case of esterification, use of 0.05 to 0.5 wt % of a catalyst based on the total weight of the hydrophobic polymer (a) and the hydrophilic polymer (b) is preferred in order to promote the reaction. Examples of the catalyst include inorganic acids (e.g., sulfuric acid and hydrochloric acid), organic sulfonic acids (e.g., methanesulfonic acid, p-toluenesulfonic acid, xylenesulfonic acid, and naphthalenesulfonic acid), antimony catalysts (e.g., antimony trioxide), tin catalysts (e.g., monobutyltin oxide and dibutyltin oxide), titanium catalysts (e.g., tetrabutyl titanate, bistriethanolamine titanate, and titanium potassium oxalate), zirconium catalysts (e.g., tetrabutyl zirconate and zirconium oxyacetate), and zinc catalysts (e.g., zinc acetate). In the case of using a catalyst, after the esterification, the catalyst may be neutralized if necessary, and removed by treatment with an absorber for purification.

The generated water is removed from the reaction system, for example, by any of the following methods:

(1) a method of using an organic solvent not compatible with water (e.g., toluene, xylene, or cyclohexane) and azeotropically boiling the organic solvent and the generated water under reflux, thereby removing the generated water alone from the reaction system;

(2) a method of blowing a carrier gas (e.g., air, nitrogen, helium, argon, or carbon dioxide) into the reaction system, thereby removing the generated water from the reaction system together with the carrier gas; and (3) a method of reducing the pressure inside the reaction system, thereby removing the generated water from the reaction system.

<C6-C18 Branched Alkylbenzenesulfonate (S)>

The C6-C18 branched alkylbenzenesulfonate (S) (branched alkylbenzenesulfonate whose branched alkyl group has 6 to 18 carbon atoms), hereinafter also referred to as the salt (S), in the present invention is made of an anion of a branched alkylbenzenesulfonic acid and a cation.

Herein, the branched alkylbenzenesulfonic acid refers to a benzenesulfonic acid substituted by an alkyl group having a branched structure. A straight-chain alkylbenzenesulfonic acid refers to a benzenesulfonic acid substituted by an alkyl group not having a branched structure. Herein, the branched alkyl includes an alkyl group including two or more methyl groups. In other words, it refers to an alkyl group substituted by one or more alkyl groups. For example, a 1-ethylbutyl group [CH$_3$(CH$_2$)$_2$(CH$_3$CH$_2$)CH—] is a butyl group substituted by an ethyl group (CH$_3$CH$_2$—) in which methyl groups are present at the end of the butyl group and in the ethyl group, so that it is a branched alkyl including a total of two methyl groups. The straight-chain alkyl other than the branched type is an alkyl group including one methyl group.

The C6-C18 branched alkylbenzenesulfonate (S) can improve the continuous moldability (demoldability) during molding.

The number of carbon atoms of the branched alkyl group of the C6-C18 branched alkylbenzenesulfonic acid anion is preferably 8 to 16, more preferably 10 to 14. The anion is particularly preferably an anion of a branched dodecylbenzenesulfonic acid.

Examples of cations forming the salt (S) include alkali metal (e.g., lithium, sodium, or potassium) cations and imidazolium cations.

Examples of the imidazolium cations include C5-C15 imidazolium cations, such as 1,3-dimethylimidazolium cation, 1,3-diethylimidazolium cation, 1-ethyl-3-methylimidazolium cation, 1-butyl-3-methylimidazolium cation, 1,2,3-trimethylimidazolium cation, 1,2,3,4-tetramethylimidazolium cation, 1-ethyl-2,3-dimethylimidazolium cation, 1,3-dimethyl-2-ethylimidazolium cation, 1,2-dimethyl-3-ethyl-imidazolium cation, 1,2,3-triethylimidazolium cation, 1,2,3,4-tetraethylimidazolium cation, 1,3-dimethyl-2-phenylimidazolium cation, 1,3-dimethyl-2-benzylimidazolium cation, 1-benzyl-2,3-dimethyl-imidazolium cation, 4-cyano-1,2,3-trimethylimidazolium cation, 3-cyanomethyl-1,2-dimethylimidazolium cation, 2-cyanomethyl-1,3-dimethylimidazolium cation, 4-acetyl-1,2,3-trimethylimidazolium cation, 3-acetylmethyl-1,2-dimethylimidazolium cation, 4-methylcarboxymethyl-1,2,3-trimethylimidazolium cation, 3-methylcarboxymethyl-1,2-dimethylimidazolium cation, 4-methoxy-1,2,3-trimethylimidazolium cation, 3-methoxymethyl-1,2-dimethylimidazolium cation, 4-formyl-1,2,3-trimethylimidazolium cation, 3-formylmethyl-1,2-dimethylimidazolium cation, 3-hydroxyethyl-1,2-dimethylimidazolium cation, 4-hydroxymethyl-1,2,3-trimethylimidazolium cation, and 2-hydroxyethyl-1,3-dimethylimidazolium cation.

Of these cations forming the salt (S), a sodium cation and an imidazolium cation are preferred, a sodium cation and a 1-alkyl-3-alkylimidazolium cation which has C1-C3 alkyl groups at 1- and 3-positions are more preferred, and a 1-ethyl-3-methylimidazolium cation is particularly preferred in terms of antistatic property.

<Antistatic Agent for Thermoplastic Resins (Z)>

The antistatic agent for thermoplastic resins (Z) of the present invention contains the block polymer (A) and the salt (S).

The weight ratio of the block polymer (A) to the salt (S) (weight of the block polymer (A)/weight of the salt (S)) is preferably 90/10 to 99/1, more preferably 92/8 to 98/2, still more preferably 93/7 to 97/3 in terms of mechanical strength and antistatic property.

The antistatic agent for thermoplastic resins (Z) can be produced, for example, by the following method (1) or (2):
(1) mixing the block polymer (A) and the salt (S); or
(2) reacting a polymer of a hydrophobic block (a) and a polymer of a hydrophilic block (b) by a known method to obtain the block polymer (A) while adding with the salt (S) before or in the middle of the reaction.

<Antistatic Resin Composition (Y)>

The antistatic resin composition (Y) of the present invention contains the antistatic agent (Z) and a thermoplastic resin (E) (described later).

The weight ratio of the antistatic agent (Z) to the thermoplastic resin (E) (weight of the antistatic agent (Z)/weight of the thermoplastic resin (E)) is preferably 3/97 to 20/80, more preferably 5/95 to 15/85 in terms of antistatic property and mechanical strength (mechanical properties).

Examples of the thermoplastic resin (E) include a polyphenylene ether resin (E1);

vinyl resins, such as a polyolefin resin (E2) (e.g., polypropylene, polyethylene, ethylene-vinyl acetate copolymer resin (EVA), and ethylene-ethylacrylate copolymer resin), a poly(meth) acrylic resin (E3) (e.g., polymethylmethacrylate), a polystyrene resin (E4) (a vinyl group-containing aromatic hydrocarbon alone, or a copolymer containing a vinyl group-containing aromatic hydrocarbon and at least one selected from the group consisting of a (meth)acrylic acid ester, (meth)acrylonitrile, and butadiene as structure units, such as polystyrene (PS), a styrene/acrylonitrile copolymer (AN resin), an acrylonitrile/butadiene/styrene copolymer (ABS resin), a methyl methacrylate/butadiene/styrene copolymer (MBS resin), and a styrene/methyl methacrylate copolymer (MS resin)); a polyester resin (E5) (e.g., polyethylene terephthalate, polybutylene terephthalate, polycyclohexanedimethylene terephthalate, polybutylene adipate, and polyethylene adipate); a polyamide resin (E6) (e.g., nylon 66, nylon 69, nylon 612, nylon 6, nylon 11, nylon 12, nylon 46, nylon 6/66, and nylon 6/12); a polycarbonate resin (E7) (e.g., polycarbonate and polycarbonate/ABS alloy resin); a polyacetal resin (E8); and mixtures of two or more of these.

Of these, the polyolefin resin (E2), the polystyrene resin (E4), and the polycarbonate resin (E7) are preferred, and the polystyrene resin (E4) is more preferred in terms of mechanical strength (mechanical properties) and antistatic property of the resulting molded article (described later).

The antistatic resin composition (Y) of the present invention may further contain a known additive for resins (G) if necessary, within a range that does not impair the effects of the present invention.

Examples of the additive for resins (G) include compatibilizers (e.g., carboxylic acid modified polypropylene), flame retardants (e.g., guanamine), pigments (e.g., titanium oxide), dyes (e.g., azo dye), nucleating agents (e.g., talc), lubricants (e.g., cabana wax), plasticizers (e.g., dioctyl phthalate), antioxidants (e.g., triphenyl phosphite), and ultraviolet absorbers (e.g., 2-(2'-hydroxy-5'-methylphenyl) benzotriazole).

The amount of the additive for resins (G) varies depending on the application. Yet, for example, it is 45 wt % or less based on the total weight of the antistatic agent (Z) and the thermoplastic resin (E). It is preferably 0.01 to 30 wt %, more preferably 0.1 to 10 wt % in terms of effect by the addition.

The antistatic resin composition (Y) of the present invention is obtained by melt-mixing the antistatic agent (Z), the thermoplastic resin (E), and, optionally, the additive for resins (G).

The melt-mixing method is generally a method including mixing pellet or powered components in a suitable mixer, for example, Henschel mixer, and then pelletizing by melt-mixing with an extruder.

The addition order of the components in melt-mixing is not limited, and methods may include, for example:

(1) melt-mixing the antistatic agent (Z), the thermoplastic resin (E), and, optionally, the additive for resins (G) together; and (2) melt-mixing the antistatic agent (Z) and a portion of the thermoplastic resin (E) in advance to prepare a resin composition (master batch resin composition) with a high content of the antistatic agent (Z), and then melt-mixing the remaining thermoplastic resin (E) and, optionally, the additive for resins (G).

<Molded Article>

The molded article of the present invention is obtained by molding the antistatic resin composition (Y). Examples of the molding method include injection molding, compression molding, calendaring molding, slush molding, rotational molding, extrusion molding, blow molding, foam molding, film molding (e.g. casting method, tenter method, and inflation method). The antistatic resin composition (Y) can be molded by any method suitable for the purpose.

The antistatic agent for thermoplastic resins (Z) of the present invention imparts excellent antistatic property to molded articles containing the thermoplastic resin (E). An antistatic resin composition containing the antistatic agent for thermoplastic resins (Z) of the present invention has excellent continuous moldability (demoldability) during molding, and the resulting molded articles have excellent mechanical strength (mechanical properties).

Thus, the antistatic resin composition is widely usable as a material of housing products (home appliances, office automation (OA) machines, gaming machines, and office appliances), plastic container materials (trays for cleanrooms (e.g., IC trays), and other containers), various buffer materials, covering materials (e.g. packaging films and protective films)), sheets of flooring material, artificial grass, mats, substrates of a tape (for a semiconductor fabrication process or the like), and various molded articles (e.g., automobile parts), which are molded by various molding methods (injection molding, compression molding, calendaring molding, slush molding, rotational molding, extrusion molding, blow molding, foam molding, and film molding (e.g., casting method, tenter method, and inflation method)). Thus, the antistatic resin composition is very useful.

EXAMPLES

The present invention is described below with reference to the examples and comparative examples, but the present invention is not limited thereto. Parts in the examples represent weight parts, unless otherwise specified.

Production Example 1

Production of Polyamide (a-1)

A stainless-steel pressure-resistant reaction vessel equipped with a stirrer, a thermometer, a heating and cooling device, a nitrogen inlet tube, and a decompression device was charged with c-caprolactam (79.4 parts), terephthalic acid (11.5 parts), an antioxidant ("Irganox 1010" available from BASF Japan Ltd.) (0.3 parts), and water (6 parts). After purging with nitrogen, the mixture was hermetically heated to 220° C. with stirring, and stirred at the same temperature (pressure: 0.2 to 0.3 MPa) for four hours, thus obtaining a polyamide (a-1) having a carboxy group at each end.

The polyamide (a-1) had an acid value of 78 and a Mn of 1,400.

Production Example 2

Production of Polyolefin (a2-1-1α) Having a Carboxy Group at Each End

A pressure-resistant reaction vessel similar to the one used in Production Example 1 was charged with a low-molecular-weight polypropylene obtained by thermal degradation (obtained by thermal degradation of polypropylene (MFR: 10 g/10 min) at 410±0.1° C. under nitrogen aeration (80 mL/min) for 16 minutes; Mn: 3,400; number of double bonds per 1,000 carbon atoms: 7.0; average number of double bonds per molecule: 1.8; content of polyolefins in which each end is modifiable: 90 wt %) (90 parts), maleic anhydride (10 parts), and xylene (30 parts), and these components were uniformly mixed. After purging with nitrogen, the mixture was hermetically heated to 200° C. with stirring to be melted, and reacted at the same temperature for 10 hours.

Then, excess maleic anhydride and xylene were distilled off under reduced pressure (0.013 MPa or less) at 200° C. over three hours, thus obtaining a polyolefin (a2-1-1α) (95 parts) having a carboxy group at each end of the polymer.

The polyolefin (a2-1-1α) had an acid value of 27.5 and a Mn of 3,600.

Production Example 3

Production of Polyolefin (a2-1-2) Obtained by Further Modifying Polyolefin (a2-1-1α)

A pressure-resistant reaction vessel similar to the one used in Production Example 1 was charged with the polyolefin (a2-1-1α) (88 parts) and 12-aminododecanoic acid (12 parts), and these components were uniformly mixed. Under nitrogen gas atmosphere, the mixture was heated to 200° C. with stirring, and reacted under reduced pressure (0.013 MPa or less) at the same temperature for three hours, thus obtaining a polyolefin (a2-1-2) (96 parts) obtained by further modifying the polyolefin (a2-1-1α).

The polyolefin (a2-1-2) had an acid value of 24.8 and a Mn of 4,000.

Production Example 4

Production of Polyester (a-3)

A stainless-steel pressure-resistant reaction vessel equipped with a stirrer, a thermometer, a heating and cooling device, a nitrogen inlet tube, and a decompression device was charged with 1,10-decandicarboxylic acid (68.4 parts), 1,6-hexanediol (31.6 parts), and an antioxidant ("Irganox 1010" available from BASF Japan Ltd.) (0.3 parts). Under gradual heating from 160° C. to 210° C., the mixture was polymerized under normal pressure for four hours and then at 210° C. under reduced pressure for three hours, thus obtaining a polyester (a-3) having a carboxy group at each end.

The polyester (a-3) had an acid value of 37 and a Mn of 3,000.

Production Example 5

Production of Polyamide (a-1-2)

A pressure-resistant reaction vessel similar to the one used in Production Example 1 was charged with ω-laurolactam (82.5 parts), terephthalic acid (16.3 parts), an antioxidant ("Irganox 1010" available from BASF Japan Ltd.) (0.3 parts), and water (10 parts). After purging with nitrogen, the mixture was hermetically heated to 220° C. with stirring, and stirred at the same temperature (pressure: 0.2 to 0.3 MPa) for four hours, thus obtaining a polyamide (a-1-2) having a carboxy group at each end.

The polyamide (a-1-2) had an acid value of 109 and a Mn of 1,000.

Production Example 6

Production of Modified Polyolefin (a2-1-3) Having a Hydroxy Group at Each End of the Polymer A pressure-resistant reaction vessel similar to the one used in Production Example 1 was charged with the polyolefin (a2-1-1α) (95 parts) and 2-aminoethanol (5 parts). The mixture was melted at 180° C. under a nitrogen gas atmosphere, and reacted at 180° C. for two hours. Subsequently, excess 2-aminoethanol was distilled off under reduced pressure at 180° C. for two hours, thus obtaining a modified polyolefin (a2-1-3) having a hydroxy group at each end of the polymer. The modified polyolefin (a2-1-3) had a hydroxy value of 26.0, an amine value of 0.01, and a Mn of 3,900.

Production Example 7

Production of Polyester (a-3-2)

A stainless-steel pressure-resistant reaction vessel equipped with a stirrer, a thermometer, a heating and cooling device, a nitrogen inlet tube, and a decompression device was charged with terephthalic acid (69.7 parts), 1,4-butanediol (30.3 parts), and an antioxidant ("Irganox 1010" available from BASF Japan Ltd.) (0.3 parts). Under gradual heating from 160° C. to 210° C., the mixture was polymerized under normal pressure for four hours and then at 210° C. under reduced pressure for three hours, thus obtaining a polyester (a-3-2) having a carboxy group at each end. The polyester (a-3-2) had an acid value of 107 and a Mn of 1,000.

Production Example 8

Block Polymer (A-1)

A reaction vessel equipped with a stirrer, a thermometer, and a heating and cooling device was charged with the polyamide (a-1) (223 parts) as the hydrophobic polymer (a), an EO adduct (Mn: 1,800) (279 parts) of bisphenol A as the hydrophilic polymer (b), and zirconium oxyacetate (7 parts). The mixture was heated to 240° C. with stirring, and polymerized under reduced pressure (0.013 MPa or less) at the same temperature for six hours, thus obtaining a block polymer (A-1).

The block polymer (A-1) had a Mn of 22,000 and a weight ratio (weight of the hydrophobic polymer (a)/weight of the hydrophilic polymer (b)) of 44/56.

Production Example 9

Block Polymer (A-2)

A pressure-resistant reaction vessel similar to the one used in Production Example 8 was charged with the polyolefin (a2-1-2) (60.1 parts) as the hydrophobic polymer (a), a polyetherdiol (b1-1α) (PEG (Mn: 3,000; volume specific resistance: $1 \times 10^7$ (Ω·cm)) (39.9 parts) as the hydrophilic polymer (b), an antioxidant "Irganox 1010" (0.3 parts), and zirconyl acetate (0.5 parts). The mixture was heated to 220° C. with stirring, and polymerized under reduced pressure (0.013 MPa or less) at the same temperature for three hours, thus obtaining a viscous block polymer (A-2).

The block polymer (A-2) had a Mn of 30,000 and a weight ratio (weight of the hydrophobic polymer (a)/weight of the hydrophilic polymer (b)) of 60/40.

Production Example 10

Block Polymer (A-3)

A pressure-resistant reaction vessel similar to the one used in Production Example 8 was charged with the polyester (a-3) (50 parts) as the hydrophobic polymer (a), the polyetherdiol (b1-1α) (PEG (Mn: 3,000; volume specific resistance: $1 \times 10^7$ Ω·cm)) (50 parts) as the hydrophilic polymer (b), an antioxidant "Irganox 1010" (0.3 parts), and zirconyl acetate (0.5 parts). The mixture was heated to 220° C. with stirring, and polymerized under reduced pressure (0.013 MPa or less) at the same temperature for three hours, thus obtaining a viscous block polymer (A-3). The block polymer (A-3) had a Mn of 24,000 and a weight ratio (weight of the hydrophobic polymer (a)/weight of the hydrophilic polymer (b)) of 50/50.

Production Example 11

Block Polymer (A-4)

A reaction vessel equipped with a stirrer, a thermometer, and a heating and cooling device was charged with the polyamide (a-1-2) (253 parts) as the hydrophobic polymer (a), polyethylene glycol (Mn: 1,000) (253 parts) as the hydrophilic polymer (b), and zirconium oxyacetate (7 parts). The mixture was heated to 240° C. with stirring, and polymerized under reduced pressure (0.013 MPa or less) at the same temperature for six hours, thus obtaining a block polymer (A-4).

The block polymer (A-4) had a Mn of 30,000 and a weight ratio (weight of the hydrophobic polymer (a)/weight of the hydrophilic polymer (b)) of 50/50.

Production Example 12

Block Polymer (A-5)

A pressure-resistant reaction vessel similar to the one used in Production Example 8 was charged with the modified polyolefin (a2-1-3) (59.0 parts) as the hydrophobic polymer (a), an EO adduct (Mn: 2,900) (41.0 parts) of bisphenol A as the hydrophilic polymer (b), dodecane diacid (6.0 parts), an antioxidant "Irganox 1010" (0.3 parts), and zirconium oxyacetate (0.5 parts). The mixture was heated to 220° C. with stirring, and polymerized under reduced pressure (0.013 MPa or less) at the same temperature for three hours, thus obtaining a viscous block polymer (A-5). The block polymer (A-5) had a Mn of 25,000 and a weight ratio (weight of the hydrophobic polymer (a)/weight of the hydrophilic polymer (b)) of 59/41.

Production Example 13

Block Polymer (A-6)

A pressure-resistant reaction vessel similar to the one used in Production Example 8 was charged with the polyester (a-3-2) (35.7 parts) as the hydrophobic polymer (a), an EO adduct (Mn: 1,800) (64.3 parts) of bisphenol A as the hydrophilic polymer (b), an antioxidant "Irganox 1010" (0.3 parts), and zirconium oxyacetate (0.5 parts). The mixture was heated to 220° C. with stirring, and polymerized under reduced pressure (0.013 MPa or less) at the same temperature for three hours, thus obtaining a viscous block polymer (A-6). The block polymer (A-6) had a Mn of 28,000 and a weight ratio (weight of the hydrophobic polymer (a)/weight of the hydrophilic polymer (b)) of 36/64.

Example 1

A reaction vessel equipped with a stirrer, a thermometer, and a heating and cooling device was charged with the block polymer (A-1) (97 parts) and a branched sodium dodecylbenzenesulfonate (S-1) (3 parts). After mixing and stirring at 220° C. for one hour, the mixture was taken out in the form of a strand onto a belt and pelletized, thus obtaining an antistatic agent (Z-1).

Examples 2 to 8 and Comparative Examples 1 to 4

In each of the examples and the comparative examples, the antistatic agent (Z) was obtained as in Example 1, except for following the formulation (by parts) shown in Table 1.

TABLE 1

|  |  |  | Example | | | | | | | | | Comparative Example | | | |
|---|---|---|---|---|---|---|---|---|---|---|---|---|---|---|---|
|  |  |  | 1 | 2 | 3 | 4 | 5 | 6 | 7 | 8 | 1 | 2 | 3 | 4 |
| Antistatic agent (Z) | | | Z-1 | Z-2 | Z-3 | Z-4 | Z-5 | Z-6 | Z-7 | Z-8 | Comparative Example Z-1 | Comparative Example Z-2 | Comparative Example Z-3 | Comparative Example Z-4 |
| Formulation (parts by weight) | Block polymer | (A-1) | 97 | 95 | 97 | — | — | — | — | — | 100 | 97 | 95 | 97 |
| | | (A-2) | — | — | — | 97 | — | — | — | — | — | — | — | — |
| | | (A-3) | — | — | — | — | 97 | — | — | — | — | — | — | — |
| | | (A-4) | — | — | — | — | — | 93 | — | — | — | — | — | — |
| | | (A-5) | — | — | — | — | — | — | 95 | — | — | — | — | — |
| | | (A-6) | — | — | — | — | — | — | — | 95 | — | — | — | — |
| | Salt | (S-1) | 3 | 5 | — | 3 | 3 | — | — | — | — | — | — | — |
| | | (S-2) | — | — | 3 | — | — | 7 | 5 | 5 | — | — | — | — |
| | | (Comparative Example S-1) | — | — | — | — | — | — | — | — | — | 3 | 5 | — |
| | | (Comparative Example S-2) | — | — | — | — | — | — | — | — | — | — | — | 3 |

<Materials used>
(S-1): Branched sodium dodecylbenzenesulfonate
(S-2): Branched 1-ethyl-3-methylimidazolium dodecylbenzenesulfonate
(Comparative Example S-1): Straight-chain sodium dodecylbenzenesulfonate
(Comparative Example S-2): Straight-chain 1-ethyl-3-methylimidazolium dodecylbenzenesulfonate

Examples 9 to 16 and Comparative Examples 5 to 8

In each of the examples and the comparative examples, the antistatic agent (Z) and the thermoplastic resin (E) were blended following the formulation shown in Table 2 with a Henschel mixer for three minutes. Then, the mixture was melt-kneaded in a twin-screw extruder with a vent at 100 rpm with a retention time of three minutes at 230° C., thus obtaining the antistatic resin composition (Y).

Each of the resulting antistatic resin compositions (Y) was evaluated according to <Evaluation method> described later. Table 2 shows the results.

<Evaluation Method>

1. Demoldability (Continuous Moldability)

From each resin composition, a flat plate test piece (length 70 mm, width 70 mm, thickness 2 mm) was produced using an injection molding machine (product name "PS40E5ASE" available from Nissei Plastic Industrial Co., Ltd.) at a cylinder temperature of 260° C., a mold temperature of 80° C., and a molding cycle of 30 seconds. After 2000 shots of injection molding, the demoldability of each test piece was evaluated according to <Evaluation criteria> described below.

The demoldability was evaluated based on the following formula (1):

$$\text{Demoldability (\%)} = (D2000) \times 100 / (D1) \quad (1)$$

where (D1) is the resisting force (unit: N) required for demolding at the first shot, and (D2000) is the resisting force required for demolding at the 2000th shot.

<Evaluation Criteria>
○○: less than 110%
○: 110% or more and less than 120%
Δ: 120% or more and less than 130%
x: 130% or more 2. Surface Specific Resistance (Unit: Ω)

From each resin composition, a flat plate test piece (length 100 mm, width 100 mm, thickness 2 mm) was produced using an injection molding machine (product name "PS40E5ASE" available from Nissei Plastic Industrial Co., Ltd.) at a cylinder temperature of 260° C. and a mold temperature of 80° C. Each flat plate test piece was measured using an ultra megohmmeter "DSM-8103" (available from DKK-TOA co., Ltd.) under an atmospheric environment at 23° C. with a humidity of 40% RH.

3. Izod Impact Strength (Unit: J/m)

From each resin composition, a test piece was produced using an injection molding machine (product name "PS40E5ASE" available from Nissei Plastic Industrial Co., Ltd.) at a cylinder temperature of 260° C. and a mold temperature of 80° C. Each test piece was measured according to ASTM D256 Method A (with a notch, 3.2 mm thick).

TABLE 2

|  |  |  |  | Example | | | | | | |
|---|---|---|---|---|---|---|---|---|---|---|
|  |  |  |  | 9 | 10 | 11 | 12 | 13 | 14 | 15 |
| Antistatic resin composition (Y) | | | | Y-1 | Y-2 | Y-3 | Y-4 | Y-5 | Y-6 | Y-7 |
| Formulation | Antistatic agent (Z) | Type | | Z-1 | Z-2 | Z-3 | Z-4 | Z-5 | Z-6 | Z-7 |
| | | Parts by weight | | 10 | 10 | 10 | 10 | 10 | 5 | 5 |
| | Thermoplastic resin (E) | Type | | E-1 | E-1 | E-1 | E-2 | E-3 | E-3 | E-2 |
| | | Parts by weight | | 90 | 90 | 90 | 90 | 90 | 95 | 95 |
| Evaluation results | Demoldability | | | ○ | ○○ | ○○ | ○ | ○ | ○ | ○ |
| | Surface specific resistance (Ω) | | | $2.0 \times 10^{11}$ | $9.0 \times 10^{10}$ | $8.0 \times 10^{10}$ | $2.0 \times 10^{11}$ | $2.0 \times 10^{11}$ | $1.5 \times 10^{11}$ | $1.5 \times 10^{11}$ |
| | Izod impact strength (J/m) | | | 155 | 150 | 160 | 80 | 155 | 160 | 80 |

TABLE 2-continued

|  |  |  | Example | Comparative Example | | | |
|---|---|---|---|---|---|---|---|
|  |  |  | 16 | 5 | 6 | 7 | 8 |
| Antistatic resin composition (Y) | | | Y-8 | Comparative Example Y-1 | Comparative Example Y-2 | Comparative Example Y-3 | Comparative Example Y-4 |
| Formulation | Antistatic agent (Z) | Type | Z-8 | Comparative Example Z-1 | Comparative Example Z-2 | Comparative Example Z-3 | Comparative Example Z-4 |
|  |  | Parts by weight | 10 | 10 | 10 | 10 | 10 |
|  | Thermoplastic resin (E) | Type | E-1 | E-1 | E-1 | E-1 | E-1 |
|  |  | Parts by weight | 90 | 90 | 90 | 90 | 90 |
| Evaluation results | Demoldability | | ○○ | Δ | Δ | x | Δ |
|  | Surface specific resistance (Ω) | | $8.5 \times 10^{10}$ | $2.0 \times 10^{12}$ | $4.0 \times 10^{11}$ | $2.5 \times 10^{11}$ | $9.0 \times 10^{10}$ |
|  | Izod impact strength (J/m) | | 155 | 150 | 140 | 130 | 145 |

Thermoplastic resin
(E-1): ABS resin (product name "Cevian-V320" available from Daicel Miraizu Ltd.)
(E-2): polypropylene resin (product name "SunAllomer PM771M" available from SunAllomer Co., Ltd.)
(E-3): high impact PS resin (product name "HIPS 433" available from PS Japan Co., Ltd.)

The results in Tables 1 and 2 show that the antistatic agent for thermoplastic resins (Z) of the present invention has excellent antistatic property, imparts excellent mechanical strength to the molded articles, and also improves continuous moldability (demoldability) during molding, as compared to those of the comparative examples.

INDUSTRIAL APPLICABILITY

The antistatic agent for thermoplastic resins (Z) of the present invention imparts excellent antistatic property to molded articles containing a thermoplastic resin. The antistatic resin composition has excellent continuous moldability (demoldability) during molding, and the resulting molded articles have excellent mechanical strength.

Thus, the antistatic resin composition is widely usable as a material of housing products (home appliances, office automation (OA) machines, gaming machines, and office appliances), plastic container materials (trays for cleanrooms (e.g., IC trays), and other containers), various buffer materials, covering materials (e.g. packaging films and protective films), sheets of flooring material, artificial grass, mats, substrates of a tape (for a semiconductor fabrication process or the like), and various molded articles (e.g., automobile parts), which are molded by various molding methods (injection molding, compression molding, calendaring molding, slush molding, rotational molding, extrusion molding, blow molding, foam molding, and film molding (e.g., casting method, tenter method, and inflation method)). Thus, the antistatic resin composition is very useful.

The invention claimed is:

1. An antistatic agent for thermoplastic resins (Z), comprising:
    a block polymer (A) having a block of a hydrophobic polymer (a) and a block of a hydrophilic polymer (b) as structure units; and
    a C6-C18 branched alkylbenzenesulfonate (S), wherein a cation forming the C6-C18 branched alkylbenzenesulfonate (S) is an imidazolium cation or a sodium cation.

2. The antistatic agent for thermoplastic resins (Z) according to claim 1,
    wherein the hydrophobic polymer (a) comprises at least one selected from the group consisting of a polyamide (a1), a polyolefin (a2), and a polyester (a3).

3. The antistatic agent for thermoplastic resins (Z) according to claim 1,
    wherein the hydrophilic polymer (b) is a polyether (b1).

4. The antistatic agent for thermoplastic resins (Z) according to claim 1,
    wherein the cation forming the C6-C18 branched alkylbenzenesulfonate (S) is an imidazolium cation.

5. The antistatic agent for thermoplastic resins (Z) according to claim 1,
    wherein a weight ratio of the block polymer (A) to the C6-C18 branched alkylbenzenesulfonate (S) is 90:10 to 99:1.

6. An antistatic resin composition (Y), comprising:
    the antistatic agent for thermoplastic resins (Z) according to claim 1; and
    a thermoplastic resin (E).

7. The antistatic resin composition (Y) according to claim 6,
    wherein a weight ratio of the antistatic agent (Z) to the thermoplastic resin (E) is 3:97 to 20:80.

8. A molded article,
    which is a molded article of the antistatic resin composition (Y) according to claim 6.

* * * * *